United States Patent [19]

Kato

[11] Patent Number: 4,525,656

[45] Date of Patent: Jun. 25, 1985

[54] APPARATUS FOR OPERATING PLURAL POLY PHASE A.C. MOTORS HAVING A COMMON LOAD

[75] Inventor: Kunitoshi Kato, Nagasaki, Japan

[73] Assignee: Mitsubishi Denki Kabushiki Kaisha, Tokyo, Japan

[21] Appl. No.: 523,797

[22] Filed: Aug. 16, 1983

[30] Foreign Application Priority Data

Aug. 24, 1982 [JP] Japan .................. 57-148080
Sep. 6, 1982 [JP] Japan .................. 57-156268

[51] Int. Cl.³ .................. H02P 5/52
[52] U.S. Cl. .................. 318/85; 318/100; 318/650
[58] Field of Search .................. 318/85, 99, 100, 647, 318/650, 41, 43

[56] References Cited

U.S. PATENT DOCUMENTS

| | | | |
|---|---|---|---|
| 3,596,155 | 7/1971 | Huxtable | 318/100 |
| 3,611,080 | 10/1971 | Herzog | 318/99 |
| 3,718,846 | 2/1973 | Bejach | 318/85 |
| 3,735,217 | 5/1973 | Kilgore et al. | 318/100 |
| 3,991,349 | 11/1976 | Watson et al. | 318/100 X |
| 4,056,759 | 11/1977 | Mitsui et al. | 318/99 X |
| 4,135,118 | 1/1979 | Seeger et al. | 318/85 |

FOREIGN PATENT DOCUMENTS

| | | | |
|---|---|---|---|
| 66915 | 6/1977 | Japan | 318/650 |
| 445102 | 9/1972 | U.S.S.R. | 318/85 |

OTHER PUBLICATIONS

IBM Technical Disclosure Bulletin, vol. 18, No. 4, pp. 1106–1107, Sep. 1975.

Primary Examiner—William M. Shoop
Assistant Examiner—Bentsu Ro
Attorney, Agent, or Firm—Leydig, Voit, Osann, Mayer and Holt, Ltd.

[57] ABSTRACT

Described is an operating system for a plurality of poly phase alternating current motors having a common load, said alternating current motors including a first motor which is a synchronous induction motor and a second motor which is a synchronous induction motor or a synchronous motor, and driving said load in synchronism through respective connecting means connecting said alternating current motors to said load, each of said alternating current motors having respective phase field windings excited variably by direct current supplied by separate exciter circuits. The system comprises antiparallel connected thyristor means provided to one of said exciter circuits of said first motor and means for sensing the gap between the internal phase angles of said first and second motors and supplying gate control signals to said thyristor means provided to said exciter circuit of said first motor.

6 Claims, 12 Drawing Figures

APPARATUS FOR OPERATING PLURAL POLY PHASE A.C. MOTORS HAVING A COMMON LOAD

BACKGROUND OF THE INVENTION

This invention relates to an apparatus for operating plural electric motors connected to a common load through respective connecting devices including gear wheels. More particularly, it relates to driving the load smoothly in such apparatus through controlling the excitation of the field winding of one of the electric motors which is a synchronous induction motor.

In the below, the conventional twin drive system for driving a cement mill is described by way of an example. FIG. 1 shows two synchronous induction motors being operated for driving the mill and FIG. 2 the circuit of an exciter for the synchronous induction motor. In FIG. 1, the numeral 1 designates a mill having gears, not shown, along its periphery. The numerals 2, 3 designate pinions meshing with the gears of the mill 1 and the numerals 4, 7 designate synchronous induction motors for driving the mill 1 through the associated gears. The outer periphery of the stator of motor 4 is provided with a gear, not shown, for meshing with a pinion 5. The numeral 6 designates a turning device having braking means, not shown and adapted for driving the pinion 5. The turning device 6, the pinion 5 and the gear provided to the stator of the motor 4 make up a stator shifting device for rotating the stator of the motor 4 a required angle. The numeral 8 designates a feeder or bus connected to a three-phase source which is connected to the stator of the motors 4 and 7.

Referring to FIG. 2, the numeral 10 designates a three-phase delta winding provided to the rotor of the motor 4 having phase windings 11, 12, 13 independent from one another. The numeral 9 designates a slip ring unit consisting of six slip rings. The numeral 20 designates a damper circuit connected to the R-phase winding 11. The numerals 21, 23 designate contactors and the numeral 22 designates a starting resistor. The numeral 24 designates a resistor of lower resistance. The numeral 30 designates an exciter circuit connected to the S-phase winding 12 and comprised of circuit elements 31 through 34 and the numeral 40 an exciter circuit connected to the T-phase winding 13 and comprised of circuit elements 41 through 44. These circuit elements 31 through 34 of the exciter circuit 30 and the elements 41 through 44 of the exciter circuit 40 correspond to the circuit elements 21 through 24 of the damper circuit 20 mentioned above. The circuits 30, 40 are connected to D.C. sources 35, 45, respectively. The rotor winding 10 is composed of the R-phase winding 11 acting as damper winding and S-phase as well as T-phase windings 12, 13 acting as exciter windings. The rotor winding and the exciter of the motor 7 are constructed similarly to those of the motor 4 depicted above.

The operation of the twin drive system is now described by referring to FIGS. 1 and 2. The stators of the synchronous induction motors 4, 7 are connected to the common source 8. In FIG. 2, the contactors 21, 31, 41 as shown are normally open and are closed for initiating the self-starting of the motor 4. The motor 4 is accelerated by adjusting the starting resistors 22, 32, 42. When the motor speed approaches to the synchronous speed, contactors 23, 33, 43 are closed, while contactors 21, 31, 41 are opened. As a result, current flows from the D.C. sources 35, 45 of the exciter circuits 30, 40 to the rotor windings 12, 13 so that the motor 4 enters into synchronous operation under load. At this time, the circuit 20 is acting as damper circuit. Similarly, the motor 7 enters into synchronous operation and the mill 1 is driven at a rated speed by motors 4, 7 through gears 2, 3.

Supposing that two synchronous induction motors 4, 7 of the same design or rating are connected to the same source and to the mill 1 under the same conditions to take care of the load, the internal phase angle or the angle between the center of the revolving field generated by the three-phase winding of the stator (armature) and the center of the magnetic field generated by the rotor winding (field winding) is same for the two motors. Since the center of the revolving field is the same for the two motors through fabrication, the center or the pole of the revolving magnetic field produced by the field winding of one motor is rotated at all times at the same relative angular position as that of the other motor. Thus the same load is shared by motors 4, 7 under the same conditions.

However, in effect, since the gears of the mill 1 do not mesh with pinions 2, 3 in the same state due to manufacture tolerance or difference in wear, the rotors of the motors 4, 7 are not rotated at the same relative angular positions at the time of starting or during running. Hence, the motors 4, 7 may be operated with different internal phase angles thus causing a difference in load sharing. Thus the load on one motor may be increased while that on the other motor decreased correspondingly. This may give rise not only to motor troubles but damage to the gears.

In order to avoid this, it is essential that the internal phase angles of the two motors be matched to each other. To this end, with the prior-art system shown in FIG. 1, the angular position of the stator of one motor 4 is shifted by a stator shifting device such as turning device 6 for shifting the center of the rotating magnetic field associated with the stator of the motor 4 in such a manner the internal phase angles of the motors 4, 7 may be matched to each other.

In the conventional operating system depicted above, the structure of the stator shifting device tends to be complex and expensive while requiring intricate maintenance. In addition, the motor stator tends to be large in size thus making it difficult to manufacture a motor capable of producing a large torque.

It should be noted that use of synchronous motors in the driving system of FIG. 1 for driving the mill 1 gives rise to a similar inconvenience and that, when pneumatic clutches are interposed between the pinions 2, 3 and the motors 4, 7, difficulties are presented in supplying compressed air to the pneumatic clutches of the motors 4, 7 under the same conditions. Thus, clutch operation is not synchronized accurately with the two motors, which may be rotated at different angular positions relative to each other.

BRIEF DESCRIPTION OF THE DRAWINGS

In the drawings, the same numerals depict same or equivalent parts.

SUMMARY OF THE INVENTION

It is therefore an object of the present invention to eliminate the above deficiency of the conventional apparatus and to provide an apparatus for operating electric motors according to which at least one of a plurality of alternating current motors is a synchronous induction motor and the direction and magnitude of the exciting current supplied to at least one of poly phase field windings of said synchronous induction motor are controlled for shifting the center of the rotating magnetic field generated by the field winding for adjusting the internal phase angle of the synchronous induction motor for more facilitated correction of the internal phase angle deviation among the motors caused for instance by disparity in gear meshing.

DESCRIPTION OF THE PREFERRED EMBODIMENTS

Figure 1:
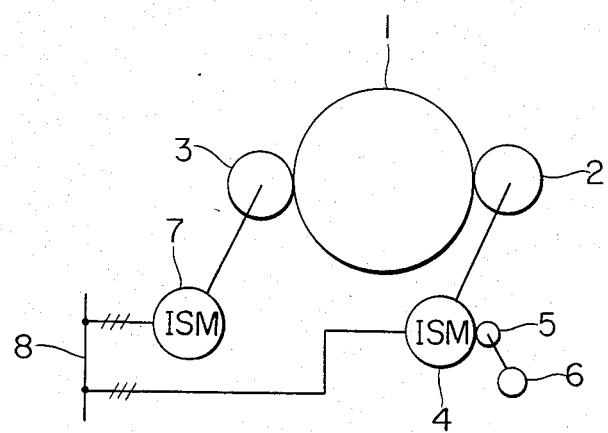
FIG. 1 is a diagrammatic overall view showing a conventional load operating system, or twin-drive system, making use of two synchronous induction motors as mill-driving alternating current motors.
Figure 2:
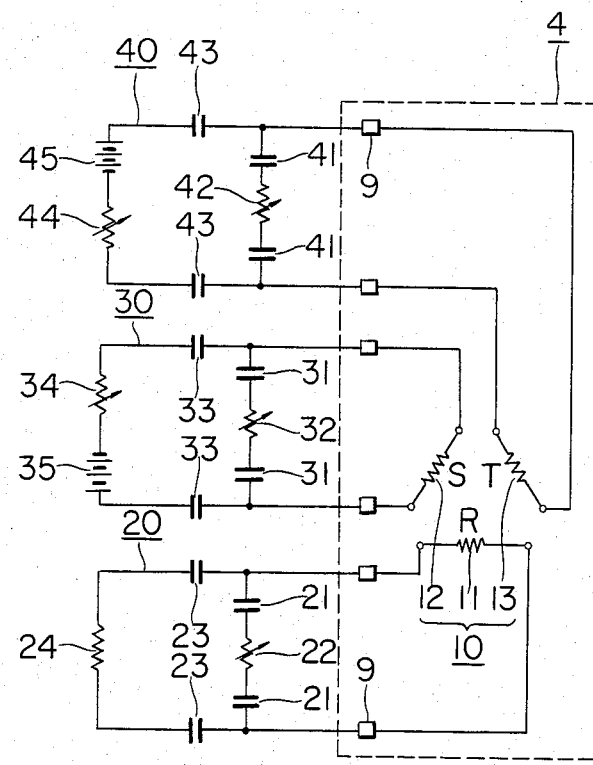
FIG. 2 shows an exciter circuit for one of the synchronous induction motors in the drive system shown in FIG. 1.
Figure 3:
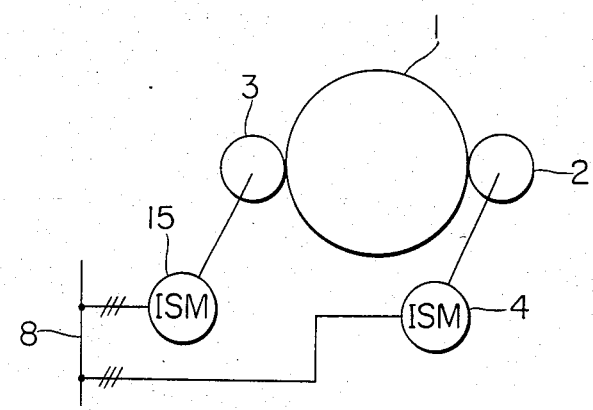
FIG. 3 is a diagrammatic overall view of an operating apparatus making use of two synchronous induction motors as alternating current motors in accordance with the present invention.
Figure 4:
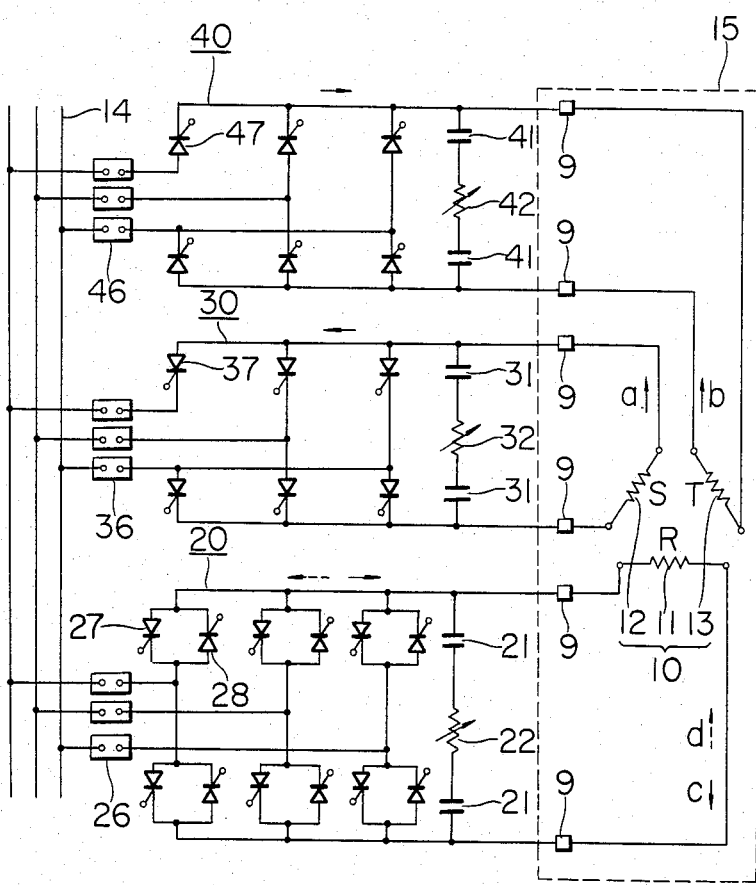
FIG. 4 shows an exciter circuit for one of the synchronous induction motors in the embodiment shown in FIG. 3.

FIGS. 3 and 4 illustrate an embodiment of the present invention. Referring to FIG. 3, the numeral 4 designates a synchronous induction motor similar to that used in the conventional system and driven by an exciter same as that shown in FIG. 2. However, the motor 4 is not provided with a stator turning device. The numeral 15 designates another synchronous induction motor having an exciter as shown in FIG. 4, where the numeral 10 designates in general a three-phase field winding similar to one used in the conventional motor, the numeral 14 designates bus lines connecting to a low-voltage three-phase A.C. source, 20, 30, 40 designate exciter circuits connected respectively to an R-phase winding 11, an S-phase winding 12 and a T-phase winding 13 of the winding 10, the numerals 26, 36, 46 designate current breakers, the numerals 27, 28 thyristors connected in antiparallel to the exciter circuit 20, and the numerals 37, 47 designate thyristors connected respectively to the exciter circuits 30, 40. In general, the exciter circuits 30, 40 are constructed similarly to the exciter circuit 20. The motor 4 is started as already described by reference to the conventional twin drive system. Turning to starting the motor 15, in FIG. 4, with the current breakers 26, 36, 46 held open, the contactors 21, 31, 41 are closed for starting the motor 15. When the motor 15 approaches the synchronous speed, the breakers 36, 46 are closed and the contactors 31, 41 opened. Gate electrodes of the thyristors 37, 47 are triggered for supplying the direct current to the S-phase winding 12 and the T-phase winding 13 for exciting these S-phase and T-phase windings.

The state of the R-phase winding 11 is not changed even when the motor approaches the synchronous speed. Thus the winding 11 is not connected to the bus line 14, but the current is supplied through starting resistor 22, the winding 11 acting as damper circuit as before. Thus the motor 15 reaches the synchronous speed and operates at synchronous speed, both the motors 4, 15 being under load.

The method of changing the internal phase angle of the synchronous induction motor 15 is now described. During normal operation, only two phase windings 12, 13 of the field winding 10 are excited, while the remaining one field winding 11 acts as damper circuit, as discussed above.

During the operation, the power developed by the motors 4, 15 is sensed by a power sensor shown in and described later by referring to FIG. 8. The command signal from this sensor operates to trigger the gate of the thyristor 27 or 28 to turn on the thyristor. In this manner, the unidirectional current flowing through field winding 11 of the motor 15 is controlled in direction and magnitude so that the center of the magnetic pole of the motor 15 is in register with that of the motor 4. The center of the magnetic field produced by the field winding 11 may be changed in this manner for changing the internal phase angle of the motor 15 for coincidence with that of the motor 4.

If it is necessary at this time to excite R-phase winding 11, current breaker 26 is closed and the contactor 21 opened.

Figure 5:
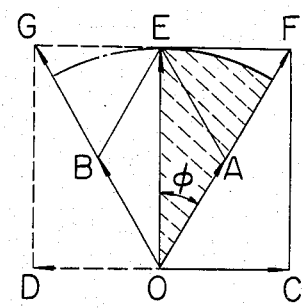
FIGS. 5, 6 are vector diagrams showing the operation of the exciter circuit shown in FIG. 4.

FIG. 5 shows in vector diagram the operating principle that the sense of the combined magnetic flux produced by field winding 10 of the synchronous induction motor 15 may be changed through a certain angle by changing the direction and magnitude of the exciting current.

When the unidirectional current is caused to flow through S-phase winding 12 in a direction a and through T-phase winding 13 in a direction b (see FIG. 4), the magnetic flux produced in the S-phase winding is shown by a vector A, while that produced in the T-phase winding is shown by a vector B, with a combined flux being shown by a vector E. This vector includes an angle (internal phase angle) $\phi$ with the center of the revolving magnetic field of the stator indicated, for example, by a vector A. These unidirectional currents may be controlled for changing the fluxes produced by the S-phase and T-phase windings so that the direction and magnitude of the combined magnetic flux may be included within a quadrangle OAEB.

When a unidirectional current is caused to flow at this time in a direction c, a combined magnetic flux of a magnetic flux C produced by R-phase winding and the aforementioned combined flux of the S-phase and T-phase winding fluxes has a magnitude equal to F and a direction registering with vector A. The currents caused to flow through the respective phase windings may be controlled for controlling the fluxes generated in the respective phase windings in such a manner that the direction and magnitude of the resulting combined flux generated by these three windings may be included within a triangle OFE.

When the current is caused to flow in an opposite direction d through R-phase winding 11, and the currents through R-, S- and T-phase windings are changed in magnitude appropriately, the combined flux generated by the three-phase windings may be included within a triangle OGE.

Figure 6:
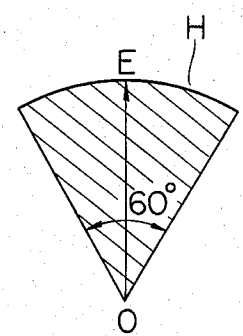

In this manner, the internal phase angle of the synchronous induction motor can be changed by changing the magnitude of the exciting currents flowing through the respective field windings, with the direction of the exciting currents through two of the phase windings being held constant and the exciting current through the remaining phase winding caused to flow in the normal or reverse direction. Above all, when the magnetic fluxes of the respective phase windings are controlled in such a manner that the tip end of the vector indicating the magnitude of the combined flux is positioned on the arc of a circle H having a center at O in FIG. 6, the internal phase angle can be changed within 60° in terms of an electrical angle with the power factor being constant (FIG. 6). It is to be noted that the magnitude of the combined flux becomes maximum when the tip end of the vector indicating the combined flux is situated on the arc of the circle H and that said magnitude may be adjusted freely to a smaller value included in the hatched line zone. In this manner, the internal phase angle of the synchronous induction motor 15 may be changed for coincidence with that of the motor 4 for equalizing the load sharing between the two motors.

Figure 7:
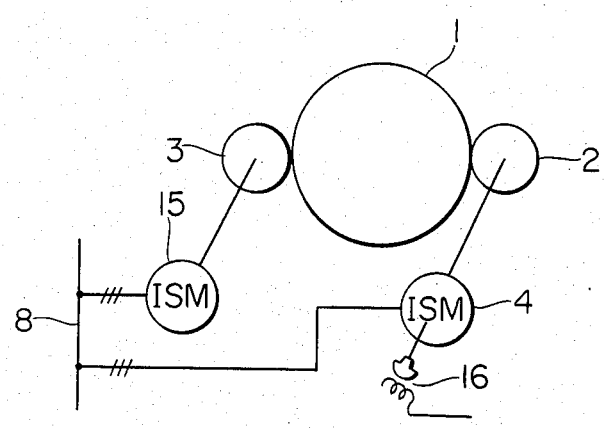
FIG. 7 is a diagrammatic overall view showing another embodiment of the apparatus according to the present invention.

A modified embodiment of the present invention is shown in FIG. 7 wherein the numeral 16 designates a pole position sensor mounted to the shaft end of motor 4. While the sensor 55 used in the embodiment shown in FIG. 8 senses the power generated by motor 4, the sensor 66 operates to sense the shaft angle of the motor 4, that is, the rotor pole position, for changing the internal phase angle as mentioned above. It should be noted that power levels of the two motors may be additionally compared to each other for compensating the internal phase angle for realizing a more uniform load sharing between the two motors. Both of the inputs from the pole position sensor and the power detector are combined to selectively trigger the thyristor gates of the exciter windings of the motor 15, as shown in FIG. 4.

In the embodiments shown in FIG. 3 or 7, the other synchronous induction motor 4 may be replaced by a synchronous motor.

Figure 8:
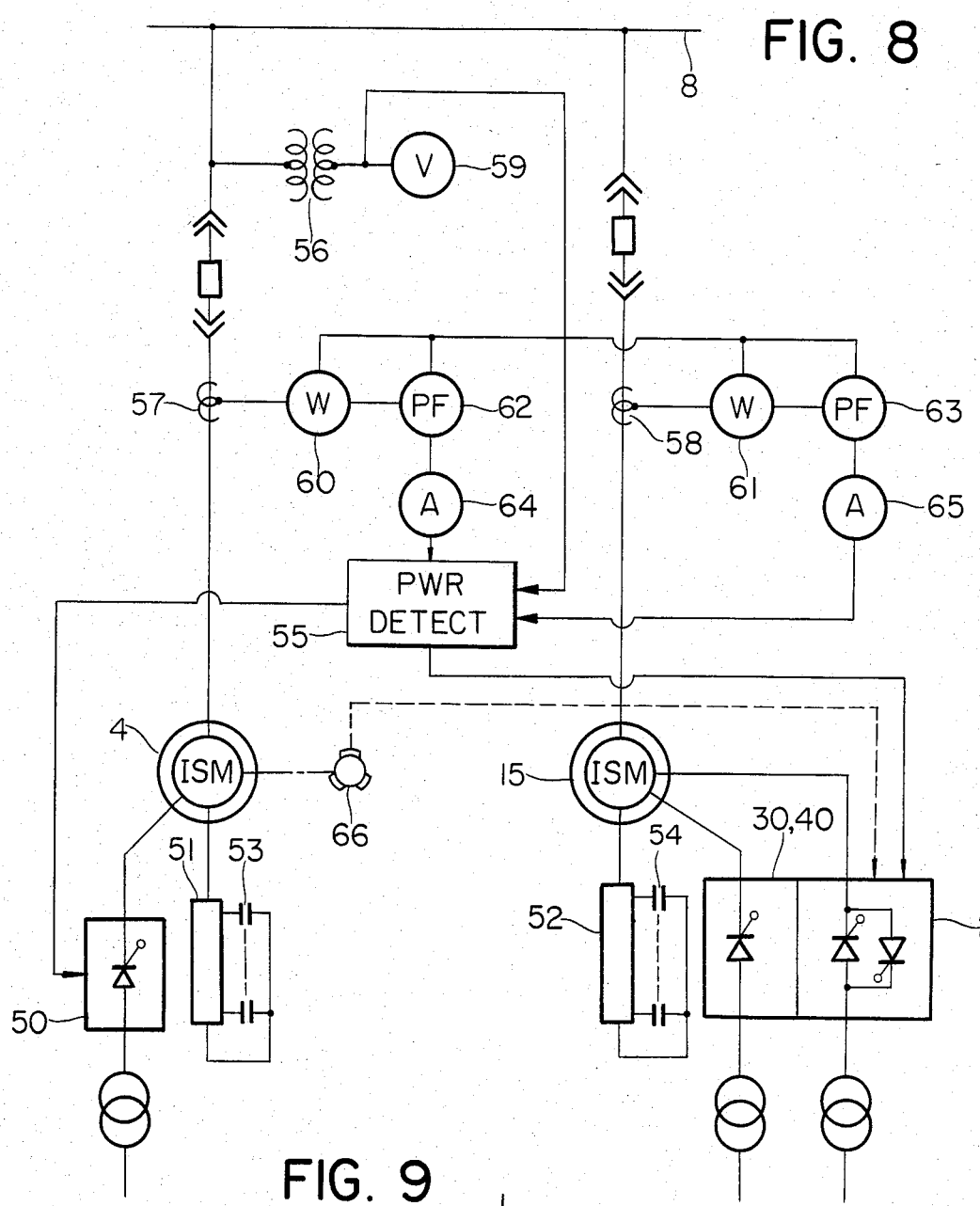
FIG. 8 is a circuit diagram of a power sensor and a magnetic position sensor in the embodiments of FIGS. 3 and 7.

FIG. 8 shows a circuit diagram for the power sensor depicted in connection with the embodiment of FIG. 3 and the pole position sensor described in connection with the embodiment of FIG. 7. In this figure, the numeral 8 designates a bus line of the three-phase power source, the numerals 4, 15 designate synchronous induction motors and the numerals 20, 30, 40 exciter circuits for motor 15. The numeral 50 designates an exciter circuit for motor 4, the numerals 51, 52 designate motor starting resistors and the numerals 53, 54 contactors for the resistors. The numeral 55 designates a power sensor adapted for receiving current and voltage components from current transformers 57, 58 and a voltage transformer 56 for issuing command signals to thyristors of the motor exciter circuit. The numeral 59 designates a voltmeter, the numerals 60, 61 designate wattmeters, the numerals 62, 63 power-factor meters and the numerals 64, 65 ammeters. The numeral 66 designates a pole position sensor such as modified version of a conventional thyristor motor shown as an example in "Mitsubishi A.C. Commutatorless Motors", Mitsubishi Denki Engineer September, 1972, pages 16 to 21. The sensor is designed to sense the pole position of the motor 4 and to deliver a command signal derived therefrom to an exciter circuit for motor 15.

From the foregoing it is seen that the arrangement according to the present invention provides for compensating and equalizing load sharing or distribution among a plurality of electric motors, while eliminating the risk of possible damage to the motors or gears, dispensing with complicated stator shifting devices and assuring high reliability as well as quick response characteristics. In addition, manufacture of the operating system for large-torque electric motors may be facilitated.

Figure 9:
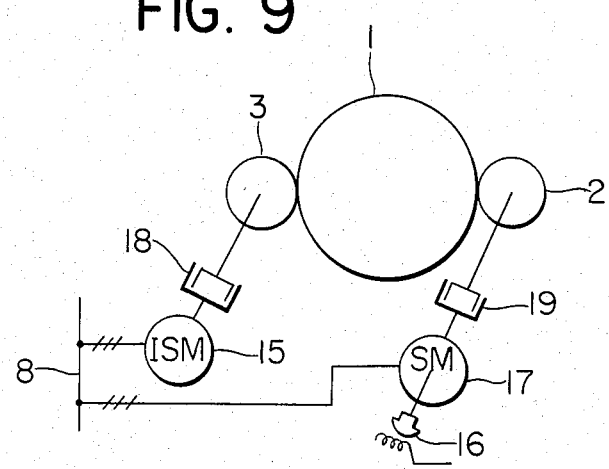
FIG. 9 is a diagrammatic overall view showing a further embodiment of the apparatus according to the present invention in which a synchronous motor and a synchronous induction motor are employed as alternating current motors.
Figure 10:
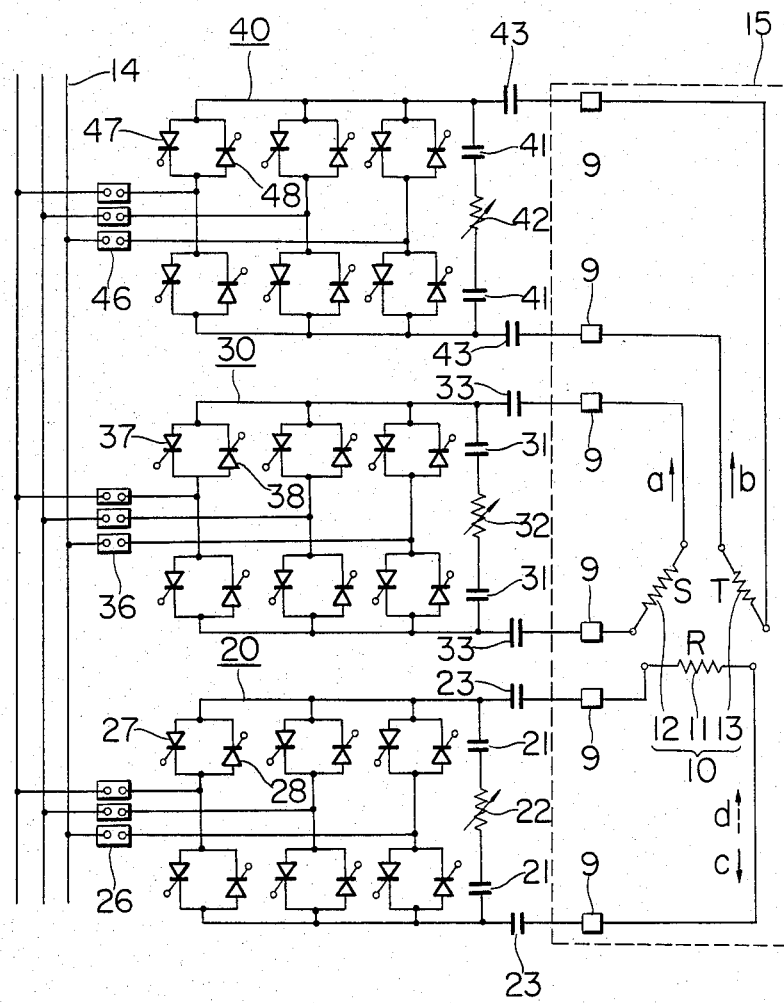
FIG. 10 is a circuit diagram of the synchronous induction motor in the embodiment shown in FIG. 9.

FIG. 9 shows a further embodiment of the present invention wherein the mill 1 is driven by a synchronous induction motor 15 and a synchronous motor 17 through pneumatic clutches 18, 19 and pinions 2, 3. A pole position sensor 16 is used for internal phase angle matching between the two motors. Thus, gate electrodes of the thyristors of the exciter circuit for motor 15 shown in FIG. 8 are controlled through the operation of the pole position sensor 16. The exciter circuit for the motor 15 is shown in FIG. 10. In the embodiment shown in FIG. 9, assuming that the difference between the centers of magnetic poles of the two motors may reach 180° in terms of a mechanical angle, in extreme cases, the arrangement is so made that the internal phase angles of the two motors may be corrected through an angle of 360°.

The operation of the embodiment shown in FIG. 9 will be described by referring to FIG. 10. With pneumatic clutches 18, 19 disengaged, motors 15, 17 are started under no load. The synchronous motor 17 may be started by conventional starting method. Starting of the synchronous induction motor 15 is described by referring to FIG. 10. In the S-phase winding, with the breaker 36 opened, contactors 31, 33 are closed to start the motor. When the motor 15 approaches the synchronous speed, breaker 36 is closed and contactor 31 opened, at the same time that the thyristor 37 is fired for causing the unidirectional current to flow in a directionn a for exciting the S-phase winding 12. In the exciter 40, thyristor 48 is fired by the similar operation for causing the current to flow in a direction b and exciting the T-phase winding 13. The R-phase circuit 11 is not connected to bus line 14 and still operating as damper even when the motor 15 approaches rated speed, with the current flowing through the starting resistor 22. In this manner, the motor 15 arrives at the rated speed. When both the motors 15, 17 have reached the rated speeds, air clutches 18, 19 are supplied with air so that the motors 15, 17 are connected to the mill 1. In this manner, the load is applied gradually to the motors so that the internal phase angles of the motors are increased gradually until completion of the connection of the clutches 18, 19.

The method for matching the internal phase angles of the motors 15, 17 by changing the internal phase angle of the synchronous induction motor 15 is now described. The pole position of motor 17 is sensed by pole position sensor 16 provided to the shaft end of the motor. The sensor signals are supplied to thyristor gates of one or two or more of the exciter circuits 20, 30, 40 for firing the thyristors. Unidirectional current is supplied in this manner to two or more of the field windings 11, 12, 13 of the motor 17 so that the centerline passing through magnetic poles generated by the rotor windings of the motor 17 is coincident at each instant with that of the motor 15. The direction and magnitude of the unidirectional current may be controlled through on/off control of the thyristors in such a manner that the centerline of the magnetic poles generated by field winding 10 is shifted so that the internal phase angle of the motor 15 may be changed freely for internal phase angle matching between the motors 15, 17. If necessary, the R-phase winding 11 can be excited by closing the breaker 26 and opening the contactors 21.

Figure 11:
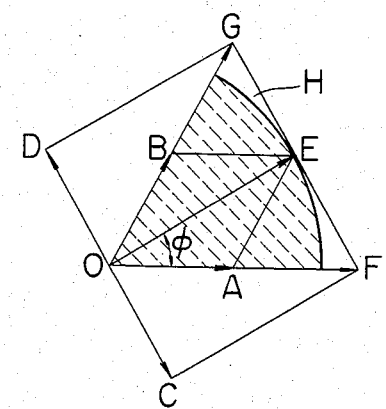
FIGS. 11 and 12 are vector diagrams showing the operation of the exciter circuit shown in FIG. 10.

FIG. 11 shows in vector diagram the manner in which the direction of the combined magnetic flux generated by the field winding 11 of the synchronous induction motor 15 can be changed through 360° by changing the direction and magnitude of the exciting current.

When the unidirectional current is supplied through S-phase winding 12 in a directionn a and through T-phase winding 13 in a direction b the magnetic flux generated in the S-phase winding 12 is shown by a vector A (FIG. 11) while that generated in the T-phase winding 13 is shown by a vector B. The combined flux is shown by a vector E. This vector E makes with the centerline of the opposing magnetic poles of the rotating magnetic field generated by the stator (indicated by, for instance, the aforementioned vector A) an angle or internal phase angle equal to $\phi$. The current flowing through these S-phase and T-phase windings may be controlled for changing the fluxes generated by these windings in such a manner that the direction and magnitude of the combined flux of the two windings may be situated within a quadrangle OAEB.

When the unidirectional current is further supplied through R-phase winding 11 in a direction c, a magnetic flux C produced by R-phase winding is added to the combined flux E of the S- and T-phase windings. The resulting combined flux F has a magnitude OF and a sense coincident with vector A. In this manner, the direction and magnitude of the combined magnetic flux can be included within a triangle OFE by changing the magnitude of the unidirectional current through R-, S- and T-phase windings in this manner and thereby changing the magnitudes of the fluxes A, B, C of the three phase windings.

When the direction of the unidirectional current flowing through R-phase winding is reversed as shown at d in FIG. 10, and the magnitude of the current flowing through R-, S- and T-phase windings is changed so that the magnitude of the respective magnetic fluxes is changed correspondingly, the direction and magnitude of the combined magnetic flux of the three-phase windings may be situated within a triangle OEG in FIG. 11.

In this manner, the internal phase angle of the synchronous induction motor can be changed by changing the direction and magnitude of the combined magnetic flux produced by the three-phase field winding of the motor. Preferably, the combined flux is changed in such a manner that the tip end of the vector indicating the combined flux may travel along the arc of circle H having the point O in FIG. 12 as center. The internal phase angle of the motor can then be changed without changing the power factor. The magnitude of the combined flux may also be reduced from the maximum value corresponding to the arc of the circle H so that it may be included within a sector of 60° shown by hatching in FIG. 12.

Figure 12:
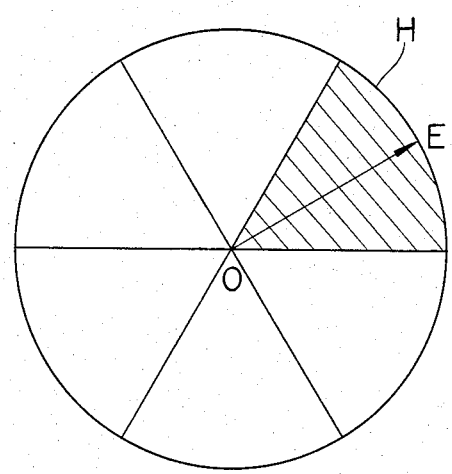

In the similar manner, the direction of the vector indicative of the combined magnetic flux can be moved freely to any angle in the region of a circle H shown in FIG. 12 by changing the magnitude of the unidirectional current flowing through R-, S- and T-phase windings. In this manner, the internal phase angle of the synchronous induction motor 15 can be changed through 360° by moving the direction and magnitude of the magnetic flux produced by the field winding 10 in the region of the circle H. Above all, the internal phase angle can be advantageously changed without changing the power factor by changing only the direction of the combined flux with the magnitude thereof remaining constant and equal to the radius of the circle H. In this manner, by changing the exciting current applied to the R-, S- and T-phase windings of the field winding 10, the internal phase angle of the synchronous induction motor 15 can be changed and coincided with that of the synchronous motor 17 for realizing equal load sharing between the two motors 15, 17.

It should be noted that, in cases where the two motors exhibit different electrical characteristics, as in the above embodiment where one of the motors is the synchronous motor and the other is the synchronous induction motor, the two motors are normally operated with different internal phase angles under the same load. Therefore, the internal phase angles of the two motors need be adjusted to predetermined mutually different values so that the two motors will develop the same motive power.

In this manner even with twin drive system, the two motors can take care of the same load by equal proportions without affecting the power factor.

It should be noted that adjustment of the internal phase angles can be started at the time the pneumatic clutch connection is started or at the time acceleration is brought to a close. In addition, the electrical powers developed by the motors may be compared to each other without sensing the pole position of one of the motors and the internal phase angle of the synchronous induction motor changed so that the electrical powers developed by the two motors may be equal to each other.

From the foregoing it will be appreciated that the arrangement of the present invention provides a highly reliable fast response operating system by means of which the load can be shared by equal proportions among a plurality of electric motors easily and accurately, there is no risk of motor or gear trouble occurrence no matter how the clutch is connected, and a complex accessory device such as stator shifting device may be eliminated.

What is claimed is:

1. An apparatus for operating a plurality of poly phase alternating current motors having a common load, said alternating current motors including a first motor which is a synchronous motor and a second motor which is a synchronous induction motor or synchronous motor, and driving said load in synchronizm through respective connecting means connecting said motors to said load, each of said alternating current motors having respective phase field windings excited variably by direct current supplied by separate exciter circuits, said apparatus comprising:
   antiparallel connected thyristor means provided to one of said exciter circuits of said first motor; and
   means for sensing the gap between the internal phase angles of said first and second motors and supplying gate control signals to said thyristor means to control the magnitude and direction of the current flow to the field winding of said exciter circuit of only said first motor so as to have the internal phase angles of the motors coincide.

2. An apparatus for operating a plurality of poly phase alternating current motors having a common load, said alternating current motors including a first motor which is a synchronous induction motor and a second motor which is a synchronous induction motor or synchronous motor, and driving said load in synchronism through respective connecting means connecting said motors to said load, each of said alternating current motors having respective phase field windings excited variably by direct current applied by separate exciter circuits, said apparatus comprising antiparallel connected thyristor means provided to one of said exciter circuits of said first motor; and means including a power sensor connected to a voltage transformer and a current transformer connected to a bus line supplying power to first and second motors and a pole position sensor associated with said first and second motors for sensing the gap between the internal phase angles of said first and second motors and supplying gate control signals to said thyristor means to control the magnitude and direction of the current flow to the field winding of said exciter circuit of only said first motor.

3. The apparatus as claimed in claim 2 wherein the exciter circuits except said one exciter circuit of said first motor are provided with thyristor means adapted for variable unidirectional current excitation of the associated field windings.

4. The apparatus as claimed in claim 2 wherein the respective exciter circuits of the respective phase field windings of said first motor are provided with thyristor means adapted for variable bidirectional current excitation of said respective phase field windings of said first motor.

5. The apparatus as claimed in claim 2 wherein said connecting means for connecting said alternating current motors to said common load include gearing means.

6. The apparatus as claimed in claim 2 wherein said connecting means for connecting said alternating current motors to said common load include pneumatic clutch means.

* * * * *